(No Model.) 3 Sheets—Sheet 1.
J. TAYLOR.
BEATING ENGINE FOR PULPING FIBROUS MATERIALS.
No. 510,208. Patented Dec. 5, 1893.
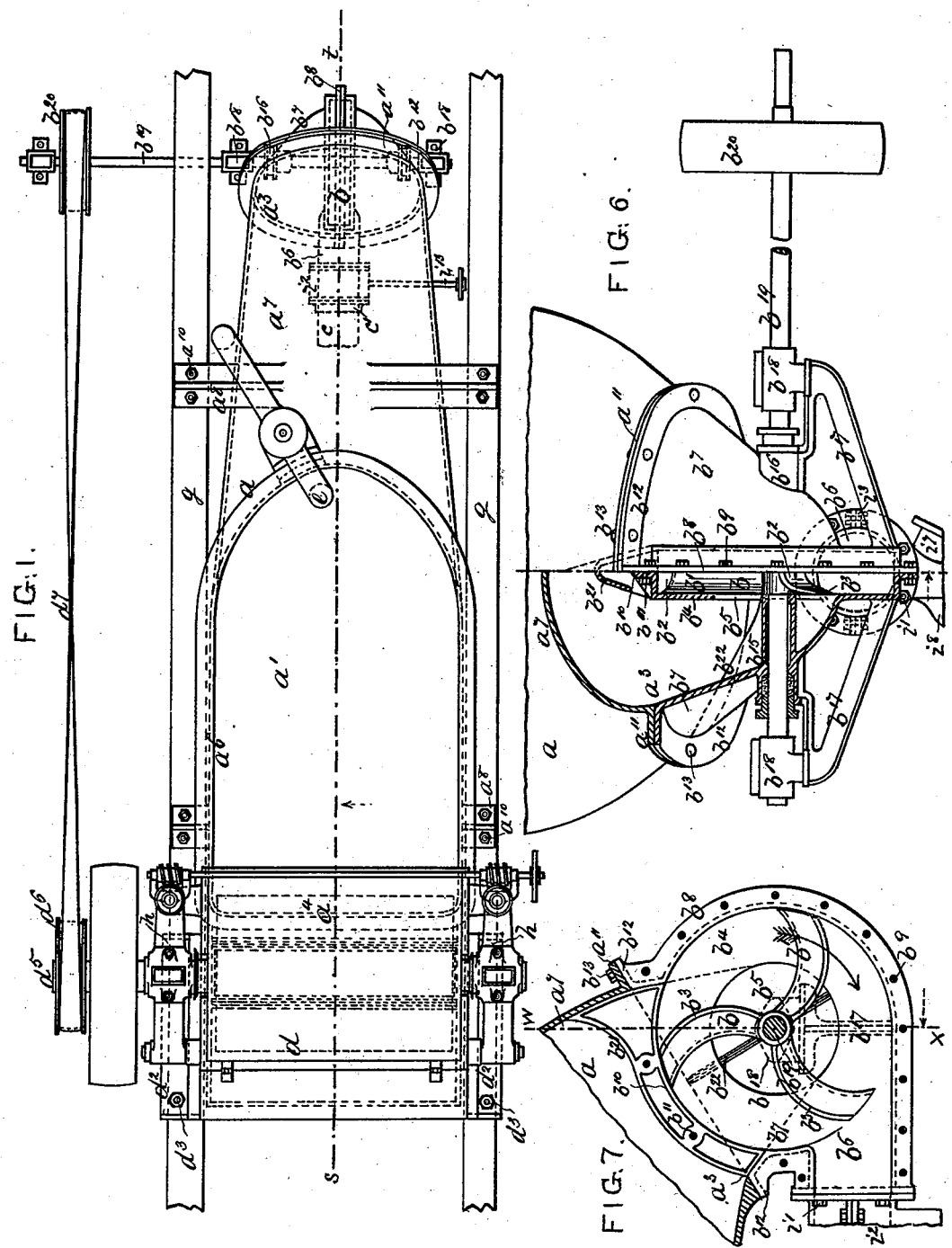
WITNESSES.
Henry Orme
Arthur Alexander Crozier.
INVENTOR.
James Taylor
by Charles Aubrey Day
Attorney.

(No Model.) 3 Sheets—Sheet 2.

J. TAYLOR.
BEATING ENGINE FOR PULPING FIBROUS MATERIALS.

No. 510,208. Patented Dec. 5, 1893.

WITNESSES.

INVENTOR.

(No Model.) 3 Sheets—Sheet 3.
J. TAYLOR.
BEATING ENGINE FOR PULPING FIBROUS MATERIALS.
No. 510,208. Patented Dec. 5, 1893.
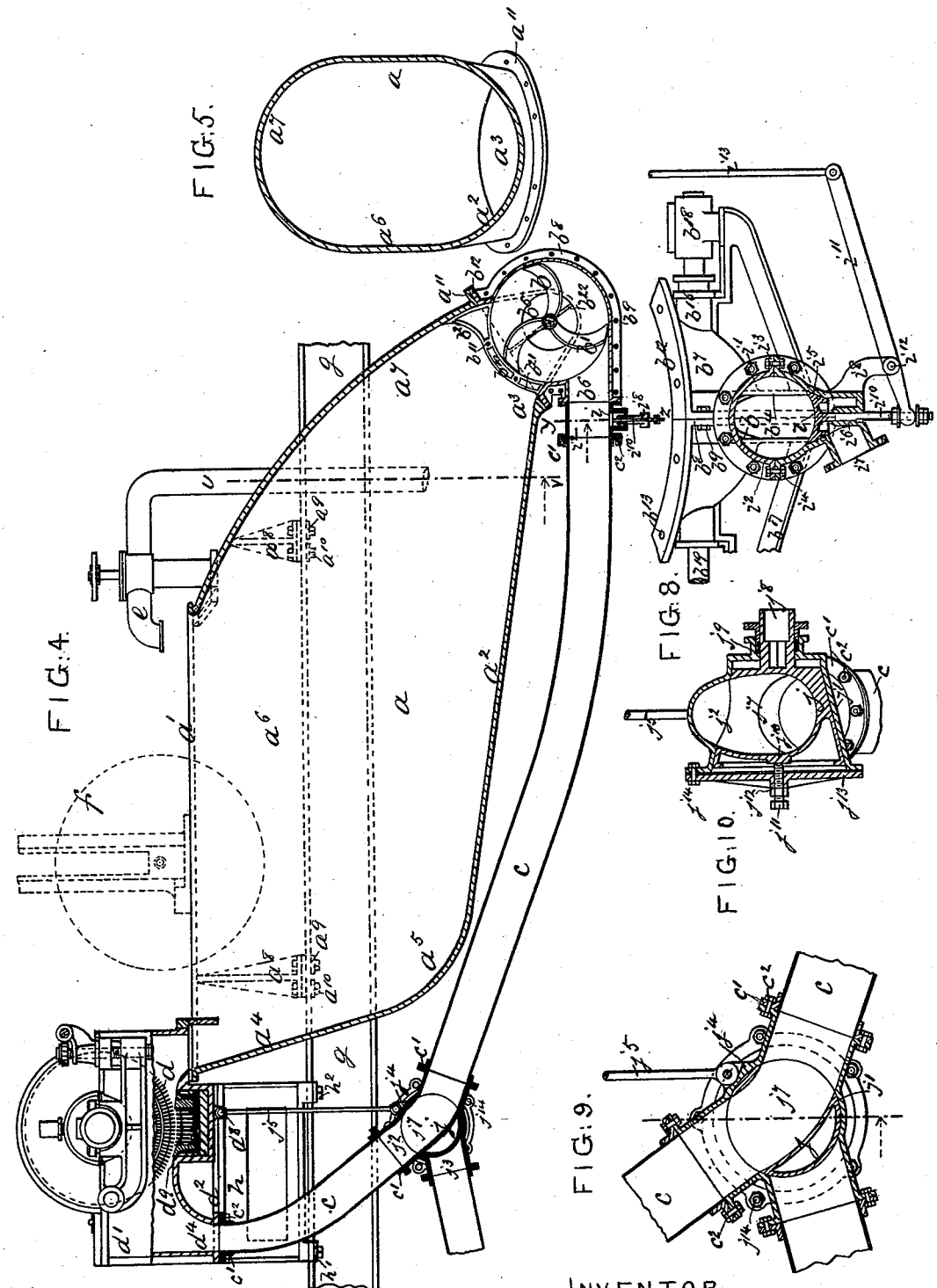

UNITED STATES PATENT OFFICE.

JAMES TAYLOR, OF LONDON, ENGLAND.

BEATING-ENGINE FOR PULPING FIBROUS MATERIALS.

SPECIFICATION forming part of Letters Patent No. 510,208, dated December 5, 1893.

Application filed August 4, 1893. Serial No. 482,340. (No model.) Patented in England April 19, 1892, No. 7,397, and in Canada March 18, 1893, No. 42,336.

*To all whom it may concern:*

Be it known that I, JAMES TAYLOR, a subject of the Queen of Great Britain and Ireland, and a resident of New Wandsworth, London, Surrey, England, have invented certain Improvements in Beating-Engines for Pulping Fibrous Materials, (for which I have obtained British Patent No. 7,397, dated April 19, 1892, and Canadian Patent No. 42,336, dated March 18, 1893,) of which the following is a specification.

This invention relates to improvements in beating engines for pulping fibrous materials used in the manufacture of paper; and consists in the construction of the trough, the means for circulating the pulp, the wash-out valve, and the discharge-cock as hereinafter explained, and in the combination of such parts and of the redelivery conduit in a vertical plane in relation to each other, whereby, among other things, I am enabled to obtain an almost absolutely uniform circulation and reduction of the pulp, an entire avoidance of any lodgment of pulp, an expeditious treatment, and, in a plant of any given capacity, a materially enlarged output in a given time with a diminished expenditure of power, and an improved product.

Figure 3:
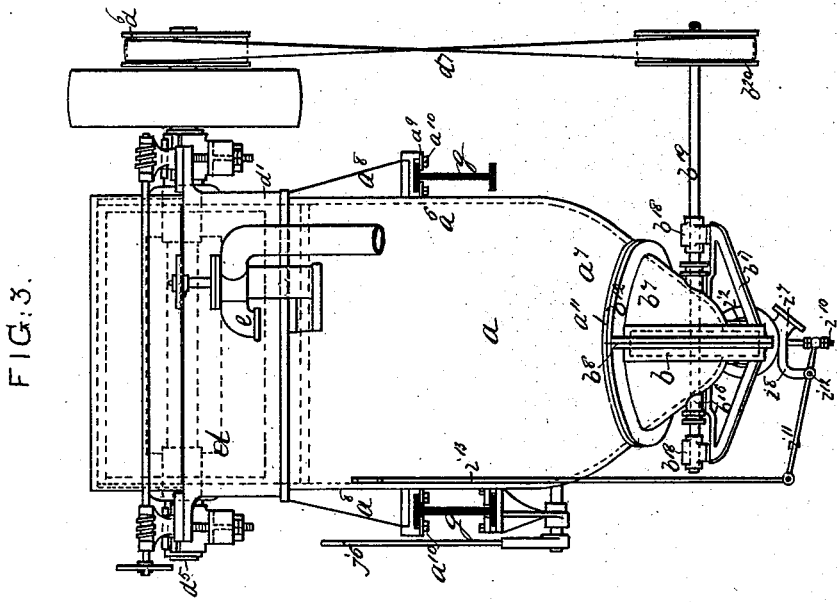
Figure 2:
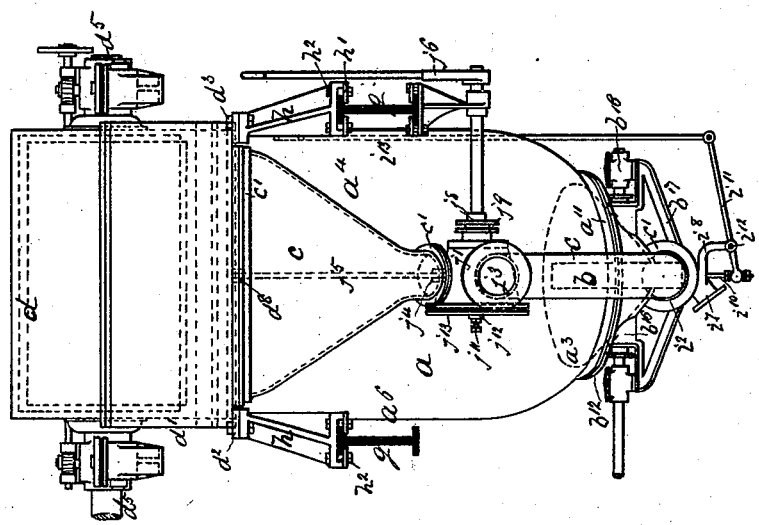

In the accompanying drawings:—Figure 1, is a plan of the improved beating engine. Fig. 2, is an elevation of one end. Fig. 3, is an elevation of the other end. Fig. 4, is a sectional elevation on the line $s$, $t$, Fig. 1, partly in side elevation. Fig. 5, is a sectional elevation of the trough on the line $u$—$v$, Fig. 4. Figs. 6, to 10, are detail views on an enlarged scale, Fig. 6, representing an end elevation, half in section on the line $w$, $x$, Fig. 7, of the circulator supports and connections; Fig. 7, an inner side elevation of one half of the circulator casing with the circulator in position and the trough in section; Fig. 8, a sectional elevation on the line $y$—$z$, Fig. 4, of the wash-out valve; Fig. 9, longitudinal sectional elevation of the discharge-cock, and Fig. 10, a transverse sectional elevation thereof.

In carrying out the invention, the trough $a$, the circulator $b$, the re-delivery conduit $c$, and its connections, and the beater-roll $d$, are, as aforesaid, arranged in a vertical plane in relation to each other, the trough being so constructed as to insure a converging concentration and gravitation of the pulp in a vertically disposed mass from the outlet of the beater-roll to the outlet from the trough with an absolute avoidance of any horizontal turning or angular deflection of the pulp such as occurs in the usual horizontally disposed troughs. To this end, the trough is constructed with an open top $a'$, Figs. 1 and 4, for a part of its length (serving to receive the supply of pulp to be treated from any suitable inlet $e$, the beaten pulp from the beater roll, and to accommodate any suitable washer $f$, Fig. 4, if required);—also with an inclined semicircular bottom $a^2$, Fig. 5, having a uniform fall, Fig. 4, to the outlet $a^3$;—with a wide flat ended inlet $a^4$, Fig. 1, steeply inclining and curving or gradually merging at $a^5$, Fig. 4, into the bottom $a^2$,—with parallel vertical sides $a^6$, Figs. 2, 3 and 5, tangential to the side edges of the semicircular bottom $a^2$, and extending to the open top $a'$;—and with a covered snout or outlet end $a^7$, Fig. 4, steeply converging in a vertical plane and also narrowing horizontally directly to the outlet $a^3$;—all such features of construction serving and co-acting to insure equally upon all particles of the pulp delivered by the beater-roll, a converging concentration and direct gravitation toward the outlet from the trough, so that all particles of pulp which pass the beater-roll at any time, being thereafter subject to like influences, will tend to traverse the trough and reach the outlet in the same time, and so an almost absolute uniformity of treatment will be thereby insured. The trough is also cast with external side flanged brackets $a^8$, and is supported by flanged laterally disposed girders $g$, the brackets $a^8$, resting thereupon and being secured by clips $a^9$, and bolts $a^{10}$, Figs. 1, 3 and 4. The girders $g$, serve also for supporting the beater-roll casing $d'$, and its attachments, the casing being flanged at $d^2$, and bolted at $d^3$, to flanged stools $h$, which rest upon the girders and are secured thereto by clips $h'$, and bolts $h^2$, Fig. 3. By thus supporting the trough and the beater-roll casing on laterally disposed girders, which can be supported by being let into the flooring or into the walls of a building, or rested on brick piers or bolted to metal standards rising from the flooring, or otherwise in any suitable manner, and by arranging the parts (consisting of the circulator $b$, the wash-out valve $i$, the re-delivery conduit $c$, and the discharge-cock $j$,) intermediate of the outlet $a^3$, from the trough and the inlet $d^4$, to the beater casing, in the same vertical plane as that in which the beater-roll and trough are also coincident, and connecting such parts to and suspending the same from below the trough and beater-roll casing, as hereinafter explained, the floor space occupied by the apparatus is very considerably reduced, much below that required by an ordinary beating engine of the same capacity, while, on the other hand the efficiency and output of the apparatus are very considerably increased. The circulator $b$, is also of a special construction designed to overcome the disadvantages of the centrifugal pumps, piston pumps or screw propellers which have hitherto been proposed to be used for returning the partly refined pulp to the beater-roll for further treatment. The main practical defect of all such devices is that owing to the peculiar consistency of the pulp and to its containing knotty and like obstructive matters, such devices very speedily become choked up and unable to operate, necessitating the stoppage of the beating engine while the pump or propeller is being cleaned out. I overcome such defects by using a circulator (vide Figs. 6 and 7) constructed with a series of arms $b'$, curved backwardly in relation to their direction of rotation, Fig. 7, and made in cross section of a hollow or ⊃-shaped formation $b^2$, Fig. 6, with sharp advance edges, $b^3$, which rotate in close contact with the inner sides of a surrounding casing $b^4$, and by feeding the pulp from a superimposed deep vertically disposed mass laterally through eyes $b^5$, formed in such casing, to the central part and on each side of the circulator $b$, so that the pressure on both sides thereof will be in equilibrium and there will be an avoidance of any tendency to jam the circulator against either side. Moreover, the hollowed formation $b^2$, of the circulator arms tends to crowd the pulp into the hollows thereof and away from the sides of the casing, and the sharp advance edges $b^3$, thereof constantly tend to keep the sides of the casing clean and free from any lodgment or accumulation of knots, and the backward curvature of the arms tends to facilitate the clearing thereof at the outlet $b^6$, from the circulator, while the superimposed mass of pulp above the circulator serves to insure an even and continuous feed thereof.

The circulator casing $b^4$, is cast in half-parts, each with the half-part of an outer casing $b^7$, the half-parts of which are flanged at $b^8$, and bolted together at $b^9$, the parts of the top of the inner casing $b^4$, being also flanged at $b^{10}$, and bolted together at $b^{11}$. The half parts of the casing $b^7$, are also flanged at $b^{12}$, and bolted at $b^{13}$, to a flange $a^{11}$, cast on the outlet $a^3$, of the trough $a$, and from such connection to the trough the casing $b^7$, converges (in continuance of the convergence of the trough $a$,) vide Fig. 6, until, at its lower part, it merges into the casing $b^4$, at a distance from the axis of the circulator equal to the radius of the eyes $b^5$. The half-parts of the casing $b^7$, are also each cast with a half-part of the flanged outlet $b^6$, and with a shaft tube $b^{15}$, a stuffing box $b^{16}$, and a laterally extending bracket $b^{17}$, carrying a bearing $b^{18}$, the shaft-tubes, stuffing-boxes and bearings being adapted to carry a shaft $b^{19}$, on which the circulator $b$, is keyed or otherwise made fast, and which is driven from the beater-roll shaft $d^5$, by pulleys $d^6$, $b^{20}$, and a strap $d^7$. The upper part $b^{21}$, of each half-part of the casing $b^4$, is made of a double inclined formation so as to deflect the mass of pulp descending from the trough equally on each of the outer sides of such casing, so that it is fed through the eyes $b^5$, to the circulator equally on both sides thereof. Each half-part of the casing $b^7$, is also cast with a diagonal web $b^{22}$, stiffening the casing and serving also to aid in grinding the descending pulp equally to the upper and lower parts of each of the eyes $b^5$.

Directly to the flanged outlet $b^6$, of the circulator is bolted at $i'$, a flanged wash-out valve casing $i^2$, Fig. 8, which is made in half-parts flanged at $i^3$, and bolted together at $i^4$, the lower half-part being cast with a valve seating $i^5$, a tubular valve-rod guide $i^6$, a flanged outlet $i^7$, and a bifurcated bracket $i^8$. To this valve seating is adapted a concaved valve $i$, carried by a guided rod $i^{10}$, which is operated, so as to raise or lower the valve as required, by a lever $i^{11}$, centered at $i^{12}$, in the bracket $i^8$, and worked by a handled rod $i^{13}$.

By locating the wash-out valve beyond and immediately adjacent to the circulator, in lieu of in the trough as ordinarily, I effectually drain all the contents descending from the trough into the circulator casing and prevent any lodgment of pulp in the trough or between it and the wash-out outlet, and by making the wash-out valve casing of the formation described, I am enabled to more conveniently inspect and adjust the fitting of its parts at any time.

The re-delivery of the pulp from the circulator to the beater-roll is effected by a tubular conduit $c$, which is riveted to flanges $c'$, bolted as at $c^2$, (Fig. 9) to the adjacent parts $i^2$, $d^2$, and to an intermediate discharge cock casing $j'$, all arranged, as aforesaid, in the plane in which the beater-roll, trough, circulator, and wash-out valve are also coincident. The conduit $c$, between the discharge cock $j$, and the inlet $d^4$, to the beater-roll gradually widens so as to deliver the pulp evenly across the full width of the beater.

The discharge-cock casing $j'$, (vide Figs. 9 and 10) is cast with flanged outlets $j^2$, $j^3$, the former directing the partly treated pulp to the inlet $d^4$, of the beater-roll casing, and the latter directing the treated pulp to the store-chests (not shown), and with lugs $j^4$ by which it is suspended by a rod $j^5$ from the lugs $d^8$, on the under side of the beater-roll casing. The body part of the casing $j'$, is made conical and is fitted with a hollow plug $j$, made with a through-way $j^7$, which can be turned into line from the conduit $c$, with either of the outlets $j^2$ or $j^3$. At its smaller end, the plug is cast with a squared socket $j^8$, which passes through a stuffing-box $j^9$, and by means of which it can be turned by a hand-lever $j^6$, and at its larger end the plug is cast with a center $j^{10}$, which is borne against by an adjustable screw $j^{11}$, working through the screwed hub $j^{12}$, of a cover plate $j^{13}$, bolted at $j^{14}$, to the adjacent flange of the plug casing.

The beater-roll $d$, and its supports and bed plate $d^9$, are of an ordinary construction.

I claim as my invention—

1. In pulp beating apparatus, the combination of a vertically arranged trough constructed with an open top, an inclined semicircular bottom having a uniform fall to the outlet, parallel vertical sides tangential to the edges of the bottom and extending to the open top, a flat-ended inlet steeply inclining and curving or gradually merging into the bottom and sides, a covered outlet-snout steeply converging in a vertical plane and narrowing horizontally to a downwardly directed outlet, serving to contain the pulp circulating therethrough in a vertically disposed mass, a beating device, and a return conduit adapted to convey material from said outlet to said beating device, as set forth.

2. In combination, a vertically arranged trough constructed to contain the pulp in a vertically disposed mass and to deliver the same by gravitation to a circulator, a beating device set above the inlet end of said trough, side stools supporting the beating device, side girders supporting both the trough and the stools carrying the beating device, a circulator attached to the outlet of the trough, a washout valve connected directly to the outlet of the circulator, and a re-delivery conduit below the trough and beating device connecting the outlet from the washout valve and the inlet to the beating device and fitted with a discharge cock, all arranged to form a circulating way for the pulp, with their centers in a co-incident vertical plane as set forth.

3. In combination, a vertically arranged trough constructed to contain the pulp in a vertically disposed mass and to deliver the same by gravitation through a bottom outlet, a circulator attached to the outlet of the trough and constructed with a series of arms curved backwardly in relation to their direction of rotation and made in cross section of a hollow formation with sharp advanced edges, and with a surrounding casing formed in section and of a double incline formation at its top and with lateral eyes concentric with the axis of the circulator and with an outer casing converging until it merges into the inner casing and formed internally with a diagonal web leading the descending pulp to each side of the circulator and with shaft tubes through which the circulator shaft passes, and externally with a lateral outlet, a washout valve connected to the outlet of the circulator, a continuing redelivery conduit, all arranged with their centers in a coincident vertical plane to form a circulating way for the pulp, and a beating device arranged at the inlet end of the trough, as set forth.

4. In a pulp beating apparatus, a trough, a circulator constructed with an inlet adapted to receive pulp by gravitation from said trough, and a series of arms curved backwardly in relation to their direction of rotation and made in cross section of a hollow formation with sharp advance edges, and with a surrounding casing formed in sections and with lateral eyes concentric with the axis of a circulator, and with an outer casing formed internally with a diagonal web leading the descending pulp to each side of the circulator and with shaft tubes through which the circulator shaft passes and externally with an outlet, the beating device, and the re-delivery conduit connecting said outlet and beating device, as set forth.

5. In pulp-beating apparatus,—a wash-out valve casing constructed in upper and lower flanged half-parts, the lower part being formed with a valve-seating, a tubular valve-rod guide, a flanged outlet and a bifurcated bracket, the valve-seat being fitted with a valve concaved to the bore of the casing and carried by a guided rod operated by a connected lever and handle, as set forth.

6. In pulp-beating apparatus,—a discharge-cock formed with an inlet, bifurcated outlets and a conical body-part made with lugs, and at its smaller end with a stuffing box, and fitted with a hollow plug made with a through-way which can be turned into line from the inlet to either of the outlets, and at its smaller end with a squared socket passing through the stuffing box and at its larger end with a center, the conical body part being fitted at its larger end with a cover plate and an adjusting screw adapted to bear against the said center to set the plug as required, as set forth.

7. In combination, a beating device, a vertically arranged trough set below the level of the outlet of the beating device, a circulator connected to the lower end of said trough and provided with means for feeding pulp, a wash-out valve connected to the outlet from said circulator, a tubular conduit for redelivering the partly treated pulp to the beating engine, a discharge cock situated in said tubular conduit, said conduit connecting the outlet from the washout valve and the inlet to the beating device and arranged below and in the vertical plane in which the beating device, trough, circulator, and washout valve are also coincident, and means depending from the beater casing for supporting said discharge cock, as set forth.

8. In combination, a beating device, a vertically arranged trough set below the level of the outlet from the beating device and adapted to deliver the pulp by gravitation through a bottom outlet, a circulator attached to the outlet of the trough and constructed with a series of rotatable arms and with a surrounding casing formed with lateral eyes concentric to the axis of the circulator arms and with an outer casing provided with shaft tubes through which the circulator shaft passes and with an outlet opening, and laterally extending brackets provided with stuffing boxes for supporting the circulator shaft, and a redelivery conduit connecting the said outlet and beating device so as to form a circulating way for the pulp, as set forth.

In testimony whereof I have signed my name to this specification in the presence of two subscribing witnesses.

JAMES TAYLOR.

Witnesses:
CHARLES AUBREY DAY,
ARTHUR ALEXANDER CROZIER.